Patented Sept. 7, 1948

2,448,799

UNITED STATES PATENT OFFICE 2,448,799

ETHYLENE POLYMER COMPOSITIONS

William B. Happoldt, Jr., Arlington, and Alfred Stockfleth, North Arlington, N. J., assignors to E. I. du Pont de Nemours & Company, Wilmington, Del., a corporation of Delaware No Drawing. Application November 3, 1945, Serial No. 626,572

7 Claims. (Cl. 260—23)

This invention relates to ethylene polymer compositions and, more particularly, to modified ethylene polymer compositions adapted to be extruded at high rates of extrusion.

In Fawcett et al. U. S. P. 2,153,553 there are described normally solid ethylene polymers and processes for preparing them. These polymers are tough solids at normal temperatures with a melting point from about 212° F. to 250° F., corresponding in composition substantially to $(CH_2)_x$, and show a crystalline structure by X-ray diffraction analysis. Generally, they have molecular weights in excess of 6,000 measured according to the method described in U. S. P. 2,153,553.

It is well established that these normally solid ethylene polymers, known as "polythene" and hereinafter referred to as polythene, have inherently outstanding properties for use as primary insulation in the manufacture of coated wires and cables for electrical applications, particularly at high frequencies where minimum electrical losses are desired. Heretofore, it has been the practice to prepare insulated conductors by extruding the polythene over a wire drawn uniformly through the die of an extrusion apparatus. However, in the extrusion of polythene, a maximum rate of extrusion is reached beyond which the surface of the extruded polythene becomes roughened and irregular. In some spots the insulation coating may be very thin which weakens the cable, and, in fact, sections of the wire may often be left entirely bare without any coating of polythene. Many attempts have been made to eliminate these imperfections at high extrusion rates by varying the temperature of extrusion, the temperature of the die and the head of the extruder, the design of the apparatus, and in other ways but none of these means has eliminated the problem or solved it to a satisfactory degree.

An object of the present invention is to provide a polythene composition of improved properties, particularly with respect to extrudability. A more specific object is to provide such a composition which will permit increasing the rate of extrusion on wire without obtaining roughness and cracking of the surface of the extruded coating or leaving sections of the wire with an irregular thin coating or sections without any coating at all. Other objects will be apparent from the description of the invention given hereinafter.

The above objects are accomplished according to the present invention by modifying polythene with, by weight of the total composition, 2% to 30%, preferably 5% to 15%, of a microcrystalline hydrocarbon wax and 0.1% to 10.0%, preferably 0.5% to 3.0%, of a metal salt of a long chain organic fatty acid. More specifically, it is preferred to use a naturally occurring microcrystalline hydrocarbon wax and a metal salt of an organic fatty acid having from 16 to 20 carbon atoms, inclusive.

It has been found that compositions as set above may be extruded into thin, smooth-surfaced coatings on wire at take-off speeds fully 100% greater than have been possible with unmodified polythene but this remarkable improvement in the extrudability of the modified polythene is not maintained if there are appreciable deviations from the composition specifications as set forth above, and seemingly equivalent materials cannot be substituted successfully in the composition as will be pointed out in more detail hereinafter.

The manner of mixing the components of the composition of this invention is not critical but the mixing should be of a character to give a uniform composition. Since in extrusion operations for which the composition is primarily designed, the plastic is usually fed into the extruder in the form of a molding powder, it is convenient to work the polythene, wax and metal salt on rolls such as are used in a rubber mill at a temperature above the melting point of the polythene, thus readily blending the components into a uniform plastic mass. The plastic is then removed from the mills in sheet or thin slab form and cut in a Ball and Jewel cutter or the like into molding powder of the desired granule size. The components may be uniformly blended in other types of mixers such as a Banbury and preferably at a temperature above the melting point of the polythene as this greatly facilitates the production of a uniform composition.

The following examples in which all parts are by weight unless otherwise noted, illustrate specefic embodiments of the invention:

Example I 91 parts of polythene, prepared according to the procedure described in U. S. P. 2,153,553 and containing 0.2% by weight of an anti-oxidant, was incorporated by hot rolling at a temperature above 2500 F. on a rubber mill with 8 parts of "Be-Square" wax (170° F to 175° F. melting point) and 1 part of zinc stearate. The thoroughly mixed composition was then cut in a Ball and Jewel cutter to 5/16 inch molding powder. The powder was fed through a Royle screw stuffer at a screw temperature of 350° F. to 440° F. and extruded over 20-gauge single-strand copper wire at a screw speed of 20 R. P. M. and a take-off speed of 250 feet per minute. The surface of the extruded coating which was 0.013 inch in thickness, was smooth and free from cracks and other imperfections.

A control batch of polythene containing 0.2% of anti-oxidant but no additional ingredients, was extruded under the same conditions and it was found the insulation cracked and broke at a take-off speed of 180 feet per minute.

Example II

The procedure set forth in Example I was used to compound 89 parts of polythene, 10 parts of "Be-Square" wax (190° F. to 195° F. melting point) and 1 part of zinc stearate. This composition was extruded over wire as in Example I at a take-off speed of 284 feet per minute and gave an insulated coating on the wire for a very smooth surface free from defects.

Example III

Wire was coated as in Example I with a composition consisting of 89 parts of polythene containing 0.2% of anti-oxidant, 10 parts of "Be-Square" wax (190° F. to 195° F. melting point) and 1 part of aluminum tristearate. This composition was extruded over wire as in Example I but at a take-off speed of 215 feet per minute and gave an insulation free from imperfections.

It will be understood that the above examples are merely illustrative and the invention broadly comprises a composition essentially consisting of polythene and, by weight of the total composition, 2% to 30% of a microcrystalline hydrocarbon wax and 0.1% to 10.0% of a metal salt of a long chain organic fatty acid.

On the basis of extensive experimental work it has been established that microcrystalline hydrocarbon waxes as a class are operative in this invention but the naturally occurring ones are preferred. These waxes are readily available on the market under various trade-names such as "Be-Square" wax of various melting points, "Socony Vacuum" wax #2305, "Petrosene B," "Super Gem" wax, "Gem Yellow" wax, and "Crown 500" wax. The melting points of these waxes cover an appreciable range but the selection of a wax of a particular melting point is not a primary consideration in the present invention. That is, the selection of a specific wax would be more governed by considerations of the properties desired in the finished product rather than in the extrudability of the plastic. Usually a wax having a melting point above 140° F. would be used and there is a slight preference for using a wax having a melting point between 170° F. and 200° F.

As contrasted to microcrystalline hydrocarbon waxes, vegetable waxes and waxes in general that are not characterized by being microcrystalline hydrocarbon waxes, are markedly inferior and not suitable for use in the present invention. Paraffine which might be expected to function as an equivalent for the waxes hereinbefore noted, will not serve to give the desired smooth coatings when the extrusion rate of the modified polythene is radically increased over the rates feasible with unmodified polythene.

While the microcrystalline hydrocarbon waxes may be used alone with polythene to effect some improvement in the extrudability of the polythene, the combination of the wax and a metal salt of a long chain fatty acid is far more effective even though the proportion of metal salt is relatively small. The metal salts, in the absence of the wax, however, are not effective and tend to give a roughened or cracked surface on extrusion at the increased take-off speeds herein contemplated. As already indicated, the proportion of wax and metal salt to polythene may be varied to an appreciable extent, even as little as 0.1% of the metal salt effecting a noticeable improvement although it is preferred to use at least 0.5%, by weight of the total composition, of the metal salt. Normally, above 3% of the metal salt does not result in further marked improvement of the composition but up to 10% may be used. The wax should be employed in larger proportion to be effective, at least 2% being used and, preferably, 5% or over. Above 30% of wax is of no advantage and may be detrimental while a maximum of 15% is sufficient under usual conditions. It is not essential that a single wax or a single metal salt be employed since a combination of two or more of either or both is the equivalent thereof.

In general, the metal salts of the long chain fatty acids are suitable in the present invention, particularly salts of the fatty acids having from 16 to 20 carbon atoms, inclusive. The metal stearates, including the metal hydroxy stearates, are preferred but salts of palmitic, margaric, oleic, nonadecanoic, and arachidic acid, for example, are satisfactory. Among the specific preferred salts may be mentioned zinc stearate, aluminum mono-, di- and tri-stearate, lead stearate, calcium stearate, sodium stearate, aluminum dihydroxy stearate, aluminum monohydroxy stearate, and cerium hydroxy stearate. Other salts, entirely operative but not quite as satisfactory in the compositions of this invention include zinc oleate, aluminum oleate, aluminum palmitate, zinc nonadeconoate, aluminum arachidate, and zinc margarate. As will be apparent to those skilled in the art and exemplifie above, the widest selection is available in the metal component of the salt, including the alkali and alkali earth metals, zinc, aluminum, lead, and the like.

The composition of the present invention essentially consists of polythene, a wax, and a metal salt but small amounts of other materials are not excluded. These other materials include fillers, pigments, stabilizers, and other synthetic and natural resins to modify the properties of the composition for a particular application. However, the addition of such materials will not be for the purpose of improving the properties of the composition from the standpoint of its ability to be extruded but rather for extraneous reasons not related to the primary purpose of this invention and the addition of such ingredients must be made with due regard to the fact that in too great proportions they can offset the advantages to be gained from the particular combination of components of which the composition of the present invention should essentially consist. These additional ingredients may be incorporated in the composition at the same time the main components are being mixed, by rolling on a mill, Banburying, or, if desired, by solvent mixing with subsequent evaporation of the solvent.

It is customary to add approximately 0.1% to 5%, by weight of the polythene, of an antioxidant, heat stabilizer and/or light stabilizer to protect the polythene when subjected to high temperatures, sunlight and outdoor exposure. Examples of such antioxidants and stabilizers are phenols and substituted phenols, such as hydroquinone, tertiary-butyl phenol, tertiary-amyl phenol, tertiary-butyl catechol, p-phenyl phenol, phenyl salicylate, di-orthocresylol propane, diphenylol propane, gallic acid, propyl gallate, resorcinol, pyrogallol and the like; aromatic amines, such as alpha- and beta-naphthylamines, diphenyl-para-phenylenediamine, di-beta-naphthyl-para-phenylenediamine, phenyl-alpha-and phenyl-beta-naphthylamines, and combinations thereof; high molecular weight amino nitrogen-containing substances, such as the reaction products of acetone and diphenylamine further condensed with formaldehyde, hexamethylene tetramine with 2-mercaptobenzothiazole and benzyl chloride, aniline and acetone and the like; sulfur containing compounds, such as 2-mercapto-benzothiazole, benzothiazyl disulfide, thiosorbitol and the like. Such antioxidants and stabilizers may be added without impairing the improved properties of the composition with respect to extrusion.

The compositions of this invention are particularly useful and designed for the manufacture of insulated wires and cables which may be used either at low or high frequencies. For instance, the composition of Example I has a dielectric constant of 2.31 and a power factor of 0.00006 at 1,000 cycles, and a dielectric constant of 2.11 and a power factor of 0.00104 at 1,000,000 cycles, both measured at 25° C., which makes it suitable for use at radio frequencies.

The combination of microcrystalline hydrocarbon waxes with metal salts of long chain fatty acids incorporated in polythene may be used to improve the surface gloss of injection molded articles as well as extruded products. The herein disclosed compositions may also be used to produce thin films and tubes having an improved surface, which are useful for the packaging of foodstuffs and other materials. For example, it is possible to extrude 6 inch outer diameter polythene tubing having an 0.004 inch wall thickness at speeds of 50% to 100% greater than with unmodified polythene and to obtain at such speeds tubing free of imperfections.

As many apparently widely different embodiments of this invention may be made without departing from the spirit and scope thereof, it is to be understood that the invention is not limited to the specific embodiments thereof except as defined in the appended claims.

We claim:
1. A plastic composition essentially comprising a mixture consisting of polythene and, by weight of said mixture, 2%–30% of a microcrystalline hydrocarbon wax, and 0.1%–10.0% of a metal salt of a long chain fatty acid.

2. A plastic composition essentially comprising a mixture consisting of polythene and, by weight of said mixture, 5%–15% of a microcrystalline hydrocarbon wax, and 0.5%–3.0% of a metal salt of a long chain fatty acid.

3. A plastic composition essentially comprising a mixture consisting of polythene and, by weight of said mixture, 2%–30% of a naturally occurring microcrystalline hydrocarbon wax, and 0.1%–10.0% of a metal salt of a long chain fatty acid.

4. A plastic composition particularly adapted for extrusion operations and essentially comprising a mixture consisting of polythene and, by weight of said mixture, 2%–30% of a microcrystalline hydrocarbon wax, and 0.1–10.0% of a metal salt of stearic acid.

5. A plastic composition particularly adapted for extrusion operations and essentially comprising a mixture consisting of polythene and, by weight of said mixture, 5%–15% of a microcrystalline hydrocarbon wax, and 0.5%–3.0% of a metal salt of stearic acid.

6. A plastic composition particularly adapted for extrusion operations and essentially comprising a mixture consisting of polythene and, by weight of said mixture, 2%–30% of a microcrystalline hydrocarbon wax, and 0.1%–10.0% of zinc stearate.

7. A plastic composition particularly adapted for extrusion operations and essentially comprising a mixture consisting of polythene and, by weight of said mixture, 2%–30% of a microcrystalline hydrocarbon wax, and 0.1%–10.0% of an aluminum stearate.

WILLIAM B. HAPPOLDT, Jr.
ALFRED STOCKFLETH.

REFERENCES CITED

The following references are of record in the file of this patent:

UNITED STATES PATENTS

| Number | Name | Date |
|---|---|---|
| 2,298,846 | Skooglund | Oct. 13, 1942 |
| 2,406,039 | Roedel | Aug. 20, 1946 |